United States Patent
von Muhlen et al.

(10) Patent No.: US 9,922,201 B2
(45) Date of Patent: Mar. 20, 2018

(54) NESTED NAMESPACES FOR SELECTIVE CONTENT SHARING

(71) Applicant: Dropbox, Inc., San Francisco, CA (US)

(72) Inventors: Marcio von Muhlen, San Francisco, CA (US); Nils Milton Bunger, San Francisco, CA (US); Emil Ibrishimov, San Francisco, CA (US); Tsahi Glik, San Francisco, CA (US); Greg Price, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 49 days.

(21) Appl. No.: 14/961,067

(22) Filed: Dec. 7, 2015

(65) Prior Publication Data
US 2016/0292443 A1    Oct. 6, 2016

Related U.S. Application Data

(60) Provisional application No. 62/141,577, filed on Apr. 1, 2015.

(51) Int. Cl.
*G06F 21/00*    (2013.01)
*G06F 21/62*    (2013.01)
(Continued)

(52) U.S. Cl.
CPC .... *G06F 21/6218* (2013.01); *G06F 17/30115* (2013.01); *G06F 17/30221* (2013.01);
(Continued)

(58) Field of Classification Search
CPC ........... G06F 21/6218; G06F 17/30115; G06F 17/30221; G06F 2221/2145; H04L 63/104; H04L 63/101
See application file for complete search history.

(56) References Cited

U.S. PATENT DOCUMENTS 6,473,426 B1    10/2002    Killian
6,834,284 B2    12/2004    Acker et al.
(Continued)

FOREIGN PATENT DOCUMENTS

EP    1 517 260 A2    3/2005

OTHER PUBLICATIONS

Brim, Michael, "Extreme Scale via Group File Semantics", ProQuest Dissertations Publishing, dated 2012, Dissertation/thesis No. 3508182, 202 pages.

(Continued)

*Primary Examiner* — Kendall Dolly
(74) *Attorney, Agent, or Firm* — Hickman Palermo Becker Bingham LLP

(57) ABSTRACT

Nested namespaces for selective content sharing are provided. In a content management system, content is stored for a plurality of users. The content includes a plurality of content items and a plurality of folders arranged in a plurality of hierarchies. A plurality of root namespaces is established. Each root namespace is rooted to a root folder of an account. A first namespace rooted to a first folder selected from the plurality of folders is established. First permissions are maintained for the first namespace, granting access to a first set of users. A request to share a second folder is received. The second folder is a child of the first folder in a particular hierarchy. A second namespace rooted to the second folder is established. Second permissions are maintained for the second namespace, granting access to a second set of users.

20 Claims, 9 Drawing Sheets

(51) Int. Cl.
  *G06F 17/30* (2006.01)
  *H04L 29/06* (2006.01)
(52) U.S. Cl.
  CPC .... *H04L 63/104* (2013.01); *G06F 2221/2145* (2013.01); *H04L 63/101* (2013.01)

(56) References Cited

U.S. PATENT DOCUMENTS

| | | |
|---|---|---|
| 7,340,723 B2 | 3/2008 | Antonov et al. |
| 7,401,089 B2 | 7/2008 | Benton et al. |
| 7,689,510 B2 | 3/2010 | Lamkin |
| 7,890,646 B2 | 2/2011 | Khosravy |
| 7,925,966 B2 | 4/2011 | Kaler et al. |
| 7,937,686 B2 | 5/2011 | Sorensen et al. |
| 8,015,491 B2 | 9/2011 | Shaver |
| 8,214,747 B1 | 7/2012 | Yankovich |
| 8,307,028 B2 * | 11/2012 | Kakivaya .......... G06F 17/30067 709/201 |
| 8,312,046 B1 | 11/2012 | Eisler et al. |
| 8,341,532 B2 | 12/2012 | Ryan |
| 8,429,540 B1 | 4/2013 | Yankovich |
| 8,458,299 B2 | 6/2013 | Lin et al. |
| 8,484,260 B2 | 7/2013 | Caso |
| 8,713,106 B2 | 4/2014 | Spataro |
| 8,819,587 B1 | 8/2014 | Shrum |
| 8,892,679 B1 | 11/2014 | Destagnol |
| 8,930,412 B2 | 1/2015 | Nelson |
| 9,185,164 B1 | 11/2015 | Newhouse |
| 2002/0174180 A1 | 11/2002 | Brown |
| 2004/0068523 A1 | 4/2004 | Keith |
| 2005/0262371 A1 | 11/2005 | Luke |
| 2006/0041844 A1 | 2/2006 | Homiller |
| 2007/0100829 A1 | 5/2007 | Allen |
| 2007/0214497 A1 | 9/2007 | Montgomery et al. |
| 2007/0220220 A1 | 9/2007 | Zik |
| 2008/0046218 A1 | 2/2008 | Dontcheva |
| 2008/0141250 A1 | 6/2008 | Dorn |
| 2008/0208870 A1 | 8/2008 | Tsang |
| 2009/0055464 A1 | 2/2009 | Multer |
| 2009/0192845 A1 | 7/2009 | Gudipaty |
| 2009/0222741 A1 | 9/2009 | Shaw |
| 2009/0327405 A1 | 12/2009 | FitzGerald |
| 2010/0241711 A1 | 9/2010 | Ansari |
| 2011/0153759 A1 | 6/2011 | Rathod |
| 2011/0154431 A1 | 6/2011 | Walsh |
| 2012/0221520 A1 | 8/2012 | Garrett |
| 2013/0013560 A1 | 1/2013 | Goldberg |
| 2013/0080919 A1 | 3/2013 | Kiang |
| 2013/0135608 A1 | 5/2013 | Smith |
| 2013/0160072 A1 | 6/2013 | Reus |
| 2013/0191339 A1 | 7/2013 | Haden |
| 2013/0198600 A1 | 8/2013 | Lockhart |
| 2013/0212112 A1 | 8/2013 | Blom |
| 2013/0212484 A1 | 8/2013 | Joshi |
| 2013/0212485 A1 | 8/2013 | Yankovich |
| 2013/0227083 A1 | 8/2013 | Kim et al. |
| 2013/0268480 A1 | 10/2013 | Dorman |
| 2013/0275398 A1 | 10/2013 | Dorman |
| 2013/0275509 A1 | 10/2013 | Miccucci |
| 2014/0059642 A1 | 2/2014 | Deasy |
| 2014/0172783 A1 | 6/2014 | Suzuki |
| 2014/0181697 A1 | 6/2014 | Kirigin |
| 2014/0208220 A1 | 7/2014 | Watal |
| 2014/0215551 A1 | 7/2014 | Allain |
| 2014/0215568 A1 | 7/2014 | Kirigin |
| 2014/0229839 A1 | 8/2014 | Lynch |
| 2014/0280602 A1 | 9/2014 | Quatrano |
| 2014/0304618 A1 | 10/2014 | Carriero |
| 2014/0324777 A1 | 10/2014 | Novak |
| 2014/0359465 A1 | 12/2014 | Litan |
| 2014/0365432 A1 | 12/2014 | Jain |
| 2015/0006146 A1 | 1/2015 | Wilkes et al. |
| 2015/0058932 A1 * | 2/2015 | Faitelson .......... G06F 17/30587 726/3 |
| 2015/0082198 A1 | 3/2015 | Destagnol |
| 2015/0134808 A1 | 5/2015 | Fushman |
| 2015/0186395 A1 | 7/2015 | Yan |
| 2016/0050177 A1 | 2/2016 | Cue |
| 2016/0092443 A1 | 3/2016 | Hayes |

OTHER PUBLICATIONS

European Patent Office, "Search Report" in application No. PCT/US2016/025015, dated Jul. 14, 2016, 11 pages.

European Patent Office, "Search Report" in application No. PCT/US2016/025014, dated Jul. 14, 2016, 11 pages.

European Claims in application No. PCT/US2016/025014, dated Jul. 2016, 7 pages.

European Claims in application No. PCT/US 2016/025015, dated Jun. 2016, 6 pages.

Lefebvre, Rob, Mastering iCloud on Your Mac: Use iClouDrive to Access Your Files Like Dropbox (OS X Tips) Posted on Mar. 28, 2013, at Cult of Mac, 3 pages.

Hendrickson, Mark, Dropbox the Online Storage Solution We've Been Waiting for?, Posted on Mar. 2008, at TechChurch, 6 pages.

Dropbox Screenshot, Publically Avaiable dated Jul. 3, 2013, From http:/www.filewin.net/Dropbox/, via Internet Archive on Oct. 17, 2016, 2 pages.

U.S. Appl. No. 15/010,220, filed Jan. 29, 2016, Office Action, dated Oct. 25, 2016.

Muhlen, U.S. Appl. No. 15/010,220, filed Jan. 29, 2016, Final Office Action, dated Feb. 22, 2017.

* cited by examiner

NESTED NAMESPACES FOR SELECTIVE CONTENT SHARING

CROSS-REFERENCE TO RELATED APPLICATIONS; BENEFIT CLAIM

This application claims the benefit of Provisional Appln. 62/141,577, filed Apr. 1, 2015, the entire contents of which is hereby incorporated by reference as if fully set forth herein, under 35 U.S.C. § 119(e).

TECHNICAL FIELD

The present application relates to cloud-based content management systems. More specifically, the example embodiment(s) described herein relate to cloud-based content management systems for storing, managing, sharing and accessing digital content such as digital documents and content items.

BACKGROUND

Traditionally, businesses and other organizations have stored their digital content, such as documents, files, and other digital information, on network file servers. Such file servers are typically located on-site behind a network firewall that prevents unauthorized network access to the content items stored on the file server. Content created by employees belongs to the business. On a file server, such content is centralized, allowing a business to easily segregate personal content items from content belonging to the business. That is, the business treats all items residing on the file server as business-owned content. Furthermore, this centralized view allows a business to easily manage the content. For example, the IT manager or administrator can set access control permissions on content stored on the company file server.

To work remotely, employees often store content items locally at their personal computers, personal accounts, and/or personal storage devices so that they can work with the content items offline or otherwise while not connected to the file server. This is less than ideal from the employer's perspective because the employer has less control over the locally stored content items when compared to the content items stored on the file server. This poses risk such as when, for example, the employee's personal computing device is lost, damaged, or stolen. Furthermore, the employer loses control of access of an offline copy outside of the file server.

A business may use a cloud-based content management service to "host" their content on servers operated by the service in addition to or instead of storing content on their own file servers. Cloud-based storage provides a number of benefits to businesses and their employees alike. One example of an online content management service is the "Dropbox" service provided by Dropbox, Inc. of Sa Francisco, Calif. The Dropbox service offers the ability to synchronize and share hosted content items among multiple devices and users. This flexibility, which stems for storing and synchronizing content both at end-user devices and on Dropbox, Inc. servers, supports a variety of different on-site and remote working arrangements.

With some existing cloud-based content management systems, the content storage model is less centralized than the traditional file server model. In particular, with these systems, each user of the system has their own individual synchronization repository on their personal computing device where content items synchronized with the system are stored. Further, each user maintains their individual synchronization repository independently of each other.

Some existing systems provide mechanisms to share selected content items between synchronization repositories. For example, with some existing systems, user Alice can share a folder in her synchronization repository with user Bob such that updates Bob makes to the shared folder in his synchronization repository are seen by Alice in her synchronization repository, and vice versa. However, with existing system, ownership of the shared folder is tied to an individual. This is problematic if Alice leaves the company and decommissions her synchronization repository or simply deletes the shared folder from her synchronization repository. In this case, the folder she shared with Bob may no longer be accessible to Bob. In the worst case, all of the work accumulated in the shared folder is lost.

Another problem with shared folders on existing systems is that hierarchical information pertaining to the shared folder may be lost when the shared folder is incorporated into another's synchronization repository. For example, assume Alice has a folder in her synchronization repository with the path /A/B/C. With existing systems, if Alice shares folder /A/B/C with Chris, the folder appears as /C in Chris' synchronization repository with the hierarchical information about parent folders "A" and "B" lost. Thus, different hierarchical information may be available to different users with respect to the same resource, making it difficult to communicate about the exact location of the resource. Furthermore, additional sharing of the resource or parent resources is constrained. For example, a system may prevent Alice from sharing folder /A/B with Bob after sharing folder /A/B/C with Chris.

Overall, existing cloud-based content management systems, due to the individualized and distributed nature of synchronization repositories, increase coordination costs for a business when used for managing and storing content items belonging to the business. Given the increasing amount of digital information generated by businesses, hosting of content items by businesses with cloud-based content management services can only be expected to increase. This trend is coupled with a desire of the businesses to retain a level of control over the content they host with such services and to provide more customizable permissions over such content. The present invention fulfills this and other needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENT(S)

In the following description, for the purposes of explanation, numerous specific details are set forth in order to provide a thorough understanding of the example embodiment(s) the present invention. It will be apparent, however, that the example embodiment(s) may be practiced without these specific details. In other instances, well-known structures and devices are shown in block diagram form in order to avoid unnecessarily obscuring the example embodiment(s).

Content Management System

Figure 1:
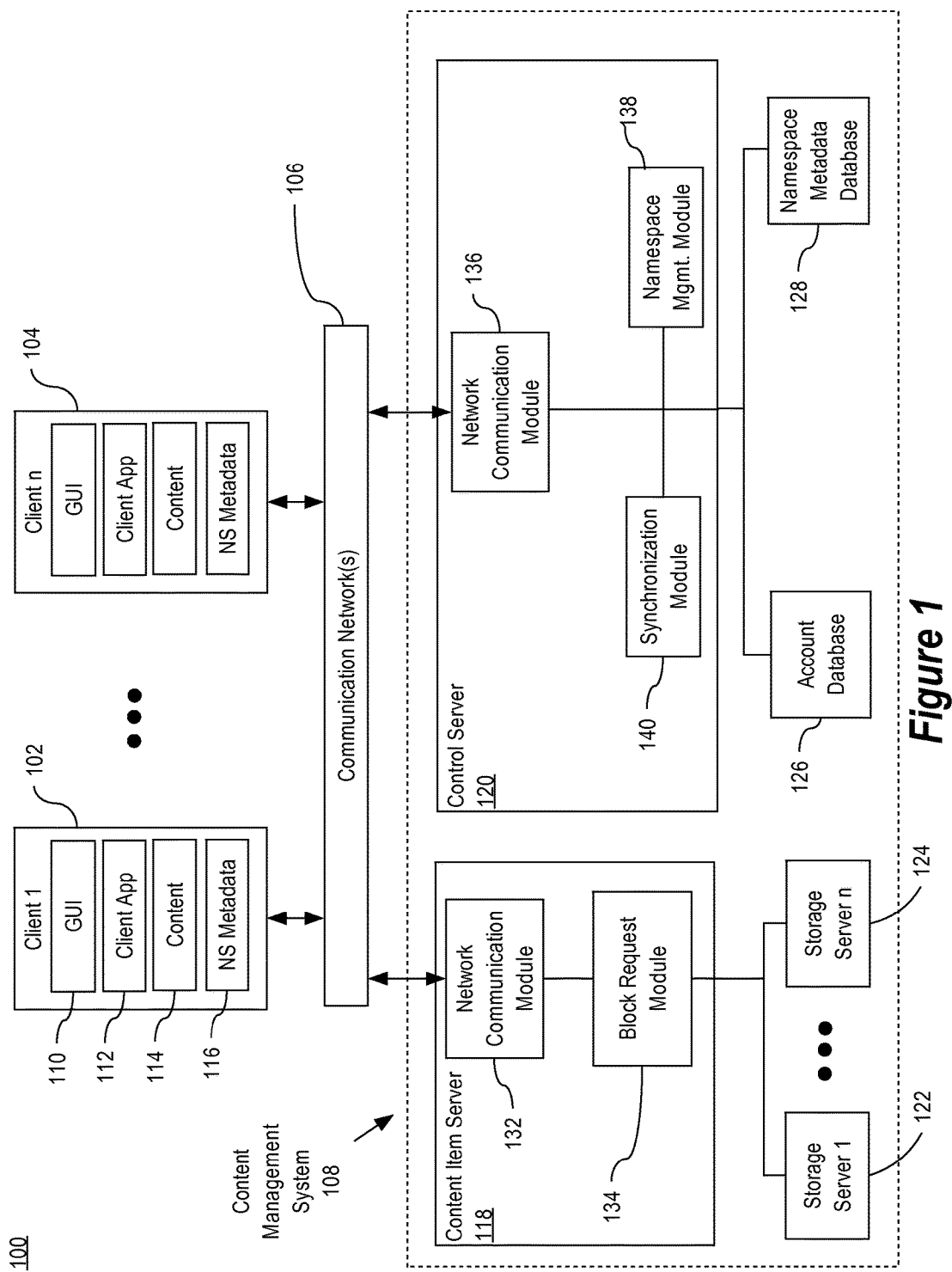
FIG. 1 is a block diagram illustrating an example of a distributed computing environment in accordance with one or more embodiments described herein.

FIG. 1 is a block diagram illustrating an example of a distributed computing environment according to one or more embodiments described herein. The distributed computing environment 100 may include one or more client devices 102-104. A client device 102-104 can be any of a number of computing devices usable to enable the activities described below, including to access content managed by the content management system 108. The client devices 102-104 may be, but are not limited to personal computers (PCs), internet kiosks, personal digital assistants, cellular telephones, smart phones, other cellular devices, gaming devices, desktop computers, laptop computers, tablet computers, other wireless devices, set-top devices, in-vehicle computers, other computing devices, and/or any combination thereof.

A client device 102-104 executes a client application 112. As used herein, the term "application" refers generally to a unit of executable software that implements a certain functionality or theme. The themes of an application vary broadly across any number of disciplines and functions (such as on-demand content management, e-commerce transactions, brokerage transactions, home entertainment, calculator etc.), and one application may have more than one theme. The unit of executable software generally runs in a predetermined environment. The client application 112 may cause one or more components to become available on the client devices 102-104, such as but not limited to a graphical user interface (GUI) 110, access to content 114 stored in association with one or more namespaces, and namespace metadata 116.

The client devices 102-104 are configured to connect to a communications network 106. The communications network 106 may include one or more communications networks such as, but not limited to, local area networks, cellular networks, wireless networks, an intranet, the Internet, and/or any other communications link over which data may be transferred. The communications network 106 connects the clients 102-104 to a cloud-based content management system 108.

The content management system 108 manages and stores managed content "in the cloud" that is accessible by users. For example, a user using a client device 102-104 may access managed content managed by the content management system 108 via a desktop application, a mobile application, a web application, or through an application program interface (API). A user may use one or more client devices 102-104. For example, a user may log into an associated account from one or more devices. In some embodiments, a user may register one or more devices with the content management system 108. Permissions for accessing content may be managed on a per-user basis and/or a per-device basis, and any combination thereof may be implemented for any subset of content.

In some embodiments, a user can access managed content through a synchronization process that synchronizes a local copy of specific content on one or more client devices 102-104 with content on one or more other client devices 102-104 and/or content stored in content management system 108. For example, a user may create or modify a document on a laptop computer device linked to the user's account, and that update is automatically replicated through the content management system 108 to a desktop computer device also linked to the user's account. Alternatively and/or in addition, an updated version of the document may be stored by the content management system 108, such as in a content item server 118, and the user may access the document over the Internet, such as from a browser or an application executing on a smartphone computer device.

Content management system 108 includes a content item server 118 and a control server 120 connected to the communications network 106, content item storage servers 122-124, a user account database 126, and a namespace metadata database 128. As used herein, the term "server" refers to any computerized component, system or entity regardless of form which is adapted to provide data, files, applications, content, or other services to one or more other devices or entities on a computer network. In accordance with some embodiments, content management system 108 is implemented on one or more conventional computing devices, such as but not limited to a server computer, a network device, a laptop computer, a desktop computer, a workstation computer, a blade server, a mainframe computer, other types of computing device, or any combination thereof.

The content management system 108 provides content management services to clients 102-104 for content, such as content items and folders stored in association with one or more namespaces. The folders may include shared folders, and the namespaces may include nested namespaces, all of which shall be described in greater detail hereafter. As used herein, the term "manage" refers to storing and providing content, storing and providing content metadata, authentication, managing permissions, creating and managing accounts, and any other function including but not limited to all the functions described herein with respect to the content management system 108.

In some embodiments, the content management system 108 is an Internet content management service for managing content over the Internet or other public network and/or an intranet content management service for managing content over a local area network (LAN) or other private network. It should be appreciated that the configuration of components within the content management system 108 is merely an example configuration, and the components within the content management system 108 may be arranged in any suitable configuration.

A content item managed by content management system 108 may be a logical collection of digital information including, but not limited to, a digital document, file, or other logical collection of digital information. Often, a content item corresponds to a known media type such as, for example, an image (e.g., JPEG, TIFF, GIF, etc.), music (e.g., .MP3, AIFF, M4A, WAV, etc.), a movie (e.g., MOV, MP4, M4V, etc.), a word processing document (e.g., DOC, DOCX, PAGES, etc.), other document (e.g., PDF, etc.), a spreadsheet document (e.g., XLS, XLSX, NUMBERS, etc.), a presentation document (e.g., PPT, PPTX, KEY, etc.), a web page (e.g., HTM, HTMLS, etc.), or a text file (e.g., TXT, RTF, etc.). However, a content item managed by content management system 108 is not limited to being a particular media type, and the content item may encompass any logical collection of digital information including binary data, text data, or other digital information.

The content management system 108 may also manage one or more folders. A folder managed by the content management system 108 is a named collection of one or more content items and/or other folders. A folder may be empty, meaning it contains no content items or other folders. Because folders can be nested in other folders, the content items and folders are arranged in a plurality of hierarchies. Leaf nodes of a hierarchy either represent a content item or an empty folder with no contents.

The content management system 108 may include multiple data centers that house backend systems comprising one or more servers such as content item servers 118, control servers 120, storage servers 122-124, and/or other servers. The data centers may be geographically dispersed from one another, such as across the continental United States. Network requests from one of the clients 102-104 to the content management system 108 are routed to an appropriate data center with a particular backend system based on a variety of possible factors such as, but not limited to the content, nature, or type of the request and/or geographic location of the network request.

In some embodiments, each backend system includes multiple control servers, such as control server 120, and/or multiple content item servers, such as content item server 118, each coupled to a communications network 106 via a respective network communication module (e.g., 132 or 136). The communications network 106 may be the Internet, but may also be any local area network (LAN) and/or wide area network (WAN).

In some embodiments, each content item server 118 and each control server 120 is a Web server that receives network requests from the client application 112 and delivers network responses to the client application 112 via HTTP, HTTPS or similar protocol. In essence, the content item servers 118 are configured to store and retrieve blocks of content items stored in storage servers 122-124 as requested by the client application 112. The control servers 120 are configured to control the content item management process in conjunction with client application 112, including providing access to content 114 stored in association with one or more namespaces, and selectively synchronizing content 114 between content management system 108 and clients 102-104 in conjunction with the client application 112 as described below.

The content item server 118 typically includes a network communication module 132 and a block request module 134. The network communications module 132 connects the content item server 118 to the communication network 106 and enables receipt of communications from the communication network 106 and the provision of communications to the communication network 106 bound for a client device 102-104 or other destinations. The block request module 134 is primarily responsible for receiving requests for content item blocks, processing them and returning the requested blocks to the client device 102 via the network communication module 132.

The storage servers 122-124 store content item blocks. Each content item block may contain all of or a portion of a content item managed by the content management system 108. Each content item block may be a fixed size such as, for example, 4 Megabytes (MB). Depending on the size of the content item, the content item may be stored on one or more of the storage servers 122-124 in one or more content item blocks, with the last content item block potentially having less than the fixed block size amount of data. For example, the block request module 134 may receive and process is "store" requests and/or "retrieve" requests to store one or more blocks of data $B_1, B_2, \ldots B_N$ corresponding to one or more specified content items.

The control server 120 includes a network communications module 136, a namespace management module 138, and a synchronization module 140, which are in communication with each other. The network communications module 136 connects the control server 120 to the communication network 106 and enables receipt of communications from the communication network 106 and the provision of communications to the communication network 106 bound for the client application 112 at a client device 102 or other destinations.

The namespace management module 138 is primarily responsible for receiving requests to view or change (i.e., add, edit, or delete) namespace metadata in the namespace metadata database 128, processing the requests, and returning a response to the requesting client device 102 via the communication module 136. In some embodiments, the namespace management module 138 maintains permissions that grant access to a particular namespace to a set of users. Permissions shall be discussed in greater detail hereafter.

In some embodiments, a user with access to a namespace may synchronize content 114 stored in association with the namespace on the client devices 102-104 with the corresponding content items managed by content management system 108. For example, the synchronization module 140 may periodically synchronize content 114 stored in association with a particular namespace and stored at a client device 102-104 with the corresponding content (e.g. content items and/or folders) stored in storage servers 122-124. When content, such as a content item or a folder, descends from a folder to which a particular namespace is rooted, then the content belongs to the particular namespace. Namespaces shall be described in greater detail hereafter.

In some embodiments, the synchronization module 140 periodically synchronizes namespace metadata 116 stored at a client device 102-104 with namespace metadata stored in namespace metadata database 128. Synchronization may be initiated when changes are detected for the content 114 belonging to the namespace, such as by long polling or short polling techniques between the client devices 102-104 and the content management system 108.

The account database 126 stores information about accounts that are created and/or managed by the content management system 108. In some embodiments, the content management system 108 supports individual accounts that each correspond to an individual user. Alternatively and/or in addition, the content management system 108 may support entity accounts. An entity account corresponds to an entity that is associated with a set of users. The set of users may be limited to users with individual accounts, or may include one or more users that do not have an account with the content management system 108. Each account may have a record in the account database 126. In some embodiments, a record for an individual account in the account database 126 includes the following information, or a subset or a superset thereof:

Account ID—A unique identifier of the account.

Authentication Credentials—Information, such as but not limited to a username and password, which may be used to authenticate a user of the account.

Linked Devices [Device $ID_1$, Device $ID_2$, . . . Device $ID_n$]—A list of one or more unique identifiers of clients 102-104 that are linked to this account. This list may also be empty if no clients 102-104 are currently linked to the account. A client device 102 may be linked to the account in a variety of different ways. In one way, a user may link the client device 102 to the account by successfully installing the client application 112 on the client device 102 and successfully authenticating against the account from the client device 102. For example, the user may successfully authenticate against the account by providing the Authentication Credentials of the account record to the control server 120 from the client device 102. In some instances, the client device 102 is not linked to the account until after the user has successfully authenticated against the account from the client device 102 and the client application 112 has successfully communicated with the control server 120 from the client device 102.

Accessible namespaces {Device IDS, [namespace $ID_1$, namespace $ID_2$, . . . namespace $ID_n$]}—For each client device 102 (Device ID) linked to the account in [Device $ID_1$, Device $ID_2$, . . . Device $ID_N$], a list of one of more identifiers of namespaces that the client device 102 has access to. In some embodiments, the individual account is also associated with a root namespace that is rooted to a root folder of the individual account. The list of accessible namespaces may include the root namespace, or may exclude the root namespace.

In some embodiments, fewer and/or additional modules, functions, or databases are included in content management system 108. The modules shown in FIG. 1 as being part of content management system 108 represent functions performed in an example embodiment.

Although FIG. 1 portrays discrete blocks, the figure is intended more as a functional description of some embodiments rather than a structural description of the functional elements. One of ordinary skill in the art will recognize that an actual implementation might have the functional elements grouped or split among various components. Similarly, the database described herein may be stored in one or more combined database and/or one or more separated databases.

Moreover, one or more blocks in FIG. 1 may be implemented on one or more servers designed to provide the described functionality. Further, although the description herein refers to certain features implemented in the client devices 102-104 and certain features implemented in the content management system 108, the embodiments of the invention are not limited to such distinctions. For example, features described herein as being part of the content management system 108 could be implemented in whole or in part in the client device 102, and vice versa.

Namespace

A namespace is a collection of content that is under common access control in content management system 108. A namespace has permissions comprising access control information that allows a set of users to access content in the namespace. Permissions can specify different types of access granted to different users for a particular namespace. Permissions shall be described in greater detail hereafter.

A namespace can be rooted to a particular folder. However, a namespace is not equivalent to a folder, and not every folder has a namespace rooted to it. When content, such as a content item or a folder, descends from a folder to which a particular namespace is rooted, then the content belongs to the particular namespace. The content that belongs to a particular namespace are also in a hierarchy that descends from the folder to which the namespace is rooted. Thus, the root folder of the namespace is the root of a particular hierarchy containing the contents that belong to the namespace.

According to some embodiments, only a subset of the content items in a namespace are synchronized with a client device 102 at any given time. For example, in some embodiments, when a user is granted access to a namespace and connects an associated client device 102 with the namespace, only a subset of data associated with the namespace is automatically downloaded from content management system 108 and stored at the client device 102, such as namespace metadata 116 and/or hierarchical data that describes the hierarchy containing the contents that belong to the namespace. In some embodiments, the hierarchical data that describes the hierarchy is treated as namespace metadata 116 and is included in the namespace metadata 116.

When only a subset of the data associated with the namespace is automatically downloaded, the user can join the client device 102 to the namespace more quickly because at least some of the content 114 stored in association with one or more namespaces in the namespace is not downloaded to the client device 102 over the communications network 106 from the content item server 118. Furthermore, this allows the user to join the client device 102 to the namespace even if the amount of available storage space at the client device 102 is less than the amount that would be needed to store most or all of the content 114 that belongs to the namespace.

In some embodiments, the GUI 110 that is presented includes a user browse-able and interactive representation of the hierarchy of the namespace. This may apply to one or more of the types of namespaces described hereafter, such as but not limited to the root namespace, a shared namespace, a nested namespace, or any combination thereof. According to some embodiments, a user can browse the hierarchy of at a client device 102 using a file system browser provided by an operating system of the client device 102, such as but not limited to the Finder on MAC OS devices or the WINDOWS EXPLORER on WINDOWS devices.

According to some embodiments, after a client device 102 becomes a member of a namespace, an actionable icon appears in the GUI 110 at the client device 102. For example, the icon may appear on the desktop of the GUI 110 provided by an operating system on the client device 102. The user may interact with the icon (e.g., double-click on the icon) to open a file explorer like-view of the content item hierarchy of the namespace. Further, an icon or other indication of the namespace may also be displayed with other resources in an interface provided by the operating system on the client device 102. For example, an actionable icon or text may be listed in the GUI 110 along with mounted drives, shared drives, network drives, or other connected resources of the client device 102. By doing so, the user can access the namespace from a familiar location where the user knows to access other connected resources such as mounted drives, external disks, and network drives.

Root Namespace

One particular type of namespace is a root namespace. In some embodiments, a root namespace is rooted to a root folder of an individual account and/or an entity account.

In some embodiments, a root namespace is rooted to a root folder of an individual account. The content items and folders associated with the user's account are arranged in a hierarchy that includes the root folder, which is the root node of the hierarchy. The root namespace includes content items and folders associated with a user's account with a cloud data storage service such as, for example, the aforementioned DROPBOX content management service. By successfully authenticating against the account (e.g., with a valid username/password), a user implicitly has access to the documents in the root namespace associated with the user's account.

In some embodiments, an individual account may be associated with multiple root namespaces, each rooted to a root folder. For example, in an implementation, multiple root namespaces may emulate multiple mounted drives in a file system. Alternatively and/or in addition, some embodiments may restrict each individual account to one root folder and one root namespace. In this case, multiple mounted drives in a file system would be emulated by child folders of the root folder.

In some embodiments, a root namespace is rooted to a root folder of an entity account. An entity account is associated with a set of users or individual accounts. Thus, a root folder of an entity account can be considered a shared folder, and the root namespace of the entity account may be considered a shared root namespace. In some embodiments, an entity account may be associated with multiple root namespaces, each rooted to a root folder of the entity account. Permissions may be managed separately for these root namespaces. Alternatively and/or in addition, some embodiments may restrict each entity account to one root folder and one root namespace.

In some embodiments, a team folder is implemented that is associated with a team. A team comprises a set of one or more users, or individual accounts. However, an entity account is not maintained for the team. The content items and folders associated with the team are arranged in a hierarchy that descends from the team folder, which is the root node of the hierarchy of content belonging to the team folder. A team namespace is rooted to the team folder. In some embodiments, the team namespace is treated as a root namespace. Alternatively and/or in addition, in some embodiments, the team namespace is treated as a shared namespace that is not a root namespace.

Shared Namespaces

In some embodiments, the content management system 108 manages one or more shared folders. The content management system 108 associates the shared folder with a namespace, which is considered a shared namespace. As used herein, the term shared namespace refers to a namespace rooted to a shared resource that multiple user can have access to, such as a shared folder.

The content management system 108 maintains permissions for the shared namespace. The permissions grant access to content that is in a shared folder, such as the folders and content items that are in a hierarchy that descends from the shared folder. This content is considered as "belonging to" the namespace rooted to the shared folder.

In some embodiments, a root folder may be a shared folder—that is, a shared namespace may be rooted to the root folder. For example, the root folder associated with an entity account may be accessible by a set of users associated with a group. A shared root folder may be implemented as a distinct type of shared folder, as a generic shared folder. In some embodiments, a shared root folder may exist in association with a group, or team, comprising a set of users; such a shared root folder does not need to be associated with a specific account, such as an entity account.

The content management system 108 maintains permissions for the shared namespace that grant access to the shared namespace to a set of users. Permissions shall be discussed in greater detail hereafter. The set of users granted access to the namespace are considered members of the namespace. In some embodiments, a namespace for which sharing is enabled is considered a shared namespace even if the number of members of the shared namespace falls to one or zero.

The permissions may grant access to the shared namespace to a set of users. Different users in the set of users may have different access types, which shall be described in greater detail hereafter. The shared namespace is used by the content management system 108 to maintain permissions that allow multiple users to access the content belonging to the shared namespace. However, in some embodiments, the set of users that are granted access to the shared namespace may fall to one user or zero users.

A shared namespace may be a shared root namespace. A shared root namespace is rooted to a root folder of an account, such as the root folder of an entity account. A shared namespace may also be rooted to a folder that is not a root folder of any account. For example, a shared namespace may be rooted to a shared folder that is a child folder of a parent folder rooted to a second namespace. As used herein, a child folder of a parent folder is a folder that descends from the parent folder in a hierarchy, either directly or indirectly. That is, a parent folder may be an ancestor with intermediate folders between the parent folder and the child folder. Thus, the second namespace is a parent namespace of the shared namespace. That is, this shared folder is in a hierarchy beginning with the parent folder to which the parent namespace is rooted. In this case, the shared namespace is a child shared namespace of the parent namespace, and is mounted at a path that is relative to the parent namespace, which is also referred to as a mounting location of a shared namespace. For example, in FIG. 2:

NS_A is rooted to folder A_ROOT, which is the root folder of NS_A;

NS_1 is rooted to folder F1, which is the root folder of NS_1;

NS_A is the parent namespace of NS_1;

NS_1 is mounted to NS_A at path /A_root/F1;

In some embodiments, when a first namespace is mounted to a path in a second namespace, the path is specified relative to the second namespace. Nested namespaces shall be described in greater detail hereafter.

In some embodiments, a shared namespace can have different synchronization configurations. These synchronization configurations can be set for all users with access to the shared namespace, or they may be set independently for each user and/or each client device 102-104. In a cloud-only synchronization configuration, the contents in the shared namespace are configured for cloud-access only. In an offline synchronization configuration, the content 114 belonging to a namespace is synchronized at the client device 102 and available for offline access. Alternatively and/or in addition, the synchronization status may be set for any shared folder and/or content item in a shared folder.

A synchronization configuration status icon may be displayed in association with the shared namespace, shared folder, and/or content item so that a user of a client device 102-104 can quickly discern the current synchronization configuration status of content. For example, GUI 110 may display the synchronization configuration status icon in association with the content that a particular user of the client device 102-104 can visually determine which content he has offline access to.

Nested Namespaces

As noted above, a namespace is a collection of content that is under common access control, and has permissions comprising access control information that allows a set of users to access content in the namespace. At the highest level, a nested namespace is a collection of content that is under common access control that may be distinct from the permissions for the parent namespace. A nested namespace may be rooted to a folder that is in a hierarchy that descends from a parent folder to which the parent namespace is rooted. The nested namespace is mounted to the parent namespace at a path relative to the parent namespace. Mounting a nested namespace is described in greater detail hereafter.

In some embodiments, a nested namespace is rooted to a shared folder within a parent shared folder, and is the nested namespace created to allow distinct permissions to be maintained for the nested folder that are distinct from permissions maintained for the parent namespace rooted to the parent shared folder. For example, a nested namespace may be created to distinctly manage access control when a user with management access to the parent namespace shares a content item or folder in the parent namespace with another user who is not a member of the parent namespace.

In some embodiments, nested namespaces are not created for content items and/or folders unless an instruction is received to create distinct permissions for the content item or folder. In some embodiments, namespaces are only rooted to folders, and unique permissions for individual content items are maintained on a per-item basis without using a namespace.

In some embodiments, the content management system 108 continues to maintain one or more nested namespaces even if the permissions for the nested namespace match the permissions for the parent namespace. For example, if a nested namespace is created because a subfolder of a parent namespace is shared to a first user who is not a member of the parent namespace, the nested namespace may be maintained even if access to the subfolder by the first user is revoked or if the first user becomes a member of the parent namespace.

Alternatively and/or in addition, the nested namespace may be removed when the permissions of the parent namespace match the permissions of the child nested namespace. The content management system 108 may implement both behaviors, either behavior, or another behavior. The behavior may depend on user input, such as a setting selected by a member with permissions to set the setting. In one embodiment, a garbage collection mechanism periodically removes nested namespaces that are no longer necessary because the permissions of the nested namespace are identical and may be merged with the permissions of a parent namespace.

A nested namespace may be mounted in different namespaces. For example, in FIG. 2, nested namespace NS_5 is mounted in parent namespace NS_3 for user A. On the other hand, for user B, who only has access to namespace NS_5 and does not have access to namespace NS_3, namespace NS_5 is mounted to user B's root namespace, NS_B. In some embodiments, one or more constraints on mounting nested namespaces are imposed by content management system 108. Such constraints may be used to prevent recursive loops, to prevent errors, to control complexity, and/or for other reasons. Constraints are described in greater detail hereafter.

Figure 2:
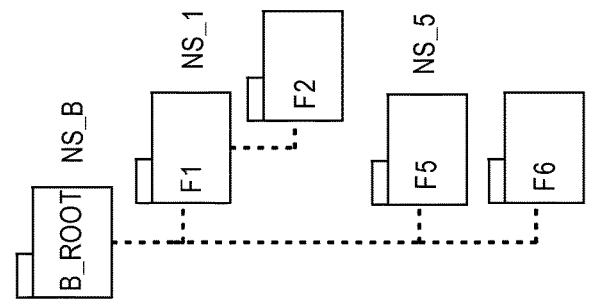
FIG. 2 illustrates example namespaces, including nested namespaces, in the context of two hierarchies in accordance with one or more embodiments.
Figure 2:
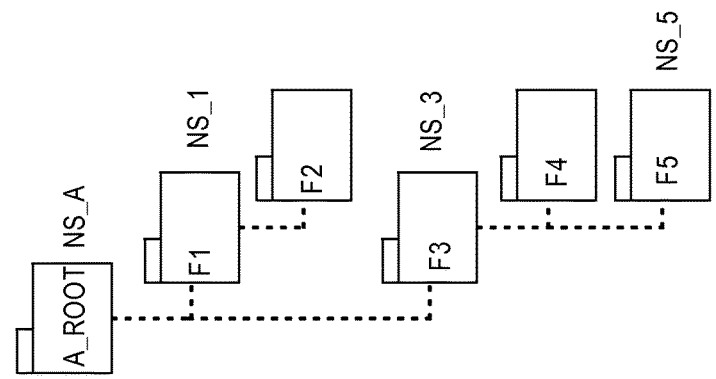

FIG. 2 illustrates example namespaces, including nested namespaces in the context of two hierarchies in accordance with one or more embodiments. FIG. 2 shows a hierarchy 200 of content available to user A and a hierarchy 200 of content available to user B that is managed by a content management system, such as content management system 108. A root namespace NS_A is rooted to the root folder A_ROOT of user A's hierarchy 200. A root namespace NS_B is rooted to the root folder B_ROOT of user B's hierarchy 202.

The content management system 108 manages a shared folder F1. Namespace NS_1 is rooted to shared folder F1. The content management system 108 maintains permissions for namespace NS_1 that grant access to namespace NS_1 to a first set of users. The permissions for namespace NS_1 grant access to both user A and user B, since namespace NS_1 is available to both users. Both users have mounted namespace NS_1 to their root folders, A_ROOT and B_ROOT, respectively.

The content management system 108 also manages folder F2. Folder F2 is a child folder of folder F1. Folder F2 is a shared folder, but no special permissions are defined for folder F2. Folder F2 is available to both user A and user B based on the permissions for namespace NS_1. In some embodiments, no namespace is rooted to F2 unless the permissions for the shared folder F2 will be maintained independently from the namespace in which the folder F2 resides, namespace NS_1.

The content management system 108 also manages folder F3. Namespace NS_3 is rooted to shared folder F3. The content management system 108 maintains permissions for namespace NS_3 that grant access to namespace NS_3 to a second set of users. The permissions for namespace NS_3 grant access to user A. User A has mounted namespace NS_3 to the root namespace NS_A. In some embodiments, the permissions for namespace NS_3 do not grant access to user B, or user B has chosen not to access NS_3.

The content management system 108 also manages folder F4. Folder F4 is a child folder of folder F3. Folder F4 is a shared folder, but no special permissions are defined for folder F4. Folder F4 is available to user A based on the permissions for namespace NS_3.

The content management system also manages folder F5. Namespace NS_5 is rooted to shared folder F5. The content management system maintains permissions for namespace NS_5 that grants access to namespace NS_5 to a third set of users. The permissions for namespace NS_5 grant access to namespace NS_5 both user A and user B, since namespace NS_5 is available to both users. User A has mounted namespace NS_5 to folder F3, while User A has mounted namespace NS_5 to its root folder B_ROOT.

The content management system also manages folder F6. F6 is a private folder of user B that is not shared. No namespace is established for folder F6.

The mount location to which a namespace is mounted can be described by a path relative to another namespace. In some embodiments, the mount location of a namespace is described by a path relative to a root namespace associated with an account. In some embodiments, a mount table is kept for multiple root namespaces. The mount table includes an identifier of the mounted namespace and a path relative to the root namespace. For example, the mount table for NS_A includes (relative to root namespace NS_A):

NS_1 at path /F1;
NS_3 at path /F3; and
NS_5 at path /F3/F5.

The mount table for NS_B includes (relative to root namespace NS_B):

NS_1 at path /F1; and
NS_5 at path /F5.

In some embodiments, one or more types of namespaces (e.g. root namespaces, shared namespaces, nested namespaces, or any combination thereof) are implemented using the same data structure, object type, and/or other implementation mechanism. Alternatively and/or in addition, one or more types of namespaces may be implemented using a distinct data structure, distinct object type, or other distinct implementation mechanism.

Example Process for Creating a Namespace

Figure 3:
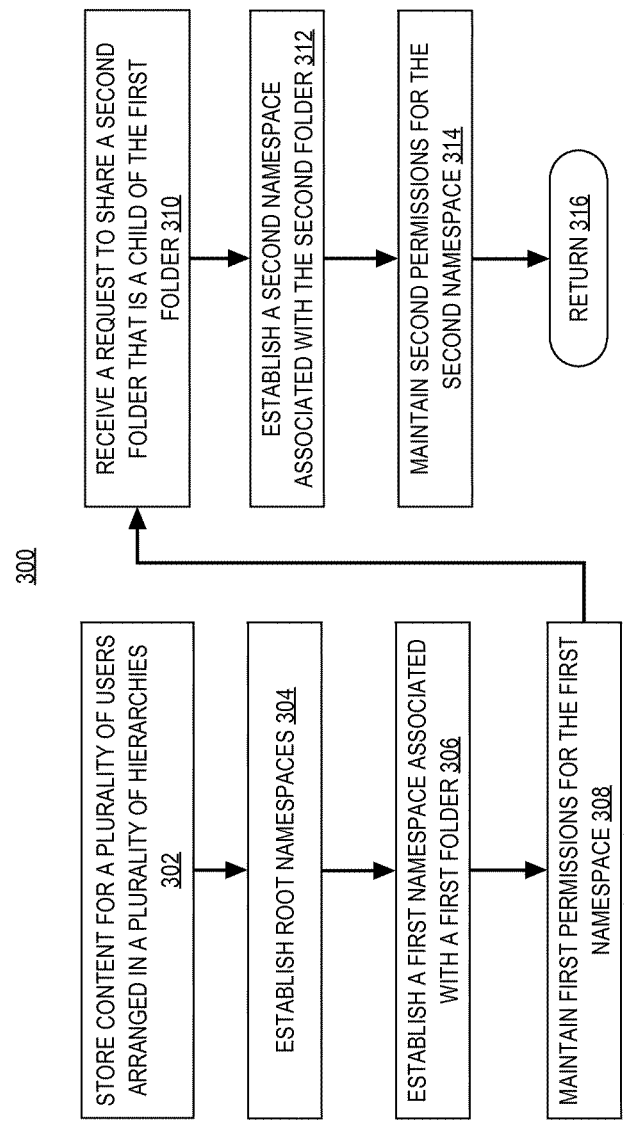
FIG. 3 is a flow diagram that depicts an example process for creating a nested namespace corresponding to a shared folder with separate permissions.

FIG. 3 is a flow diagram that depicts an example process for creating a nested namespace corresponding to a shared folder with separate permissions. Process 300 may be performed by one or more computing devices and/or processes thereof. For example, one or more blocks of process 300 may be performed by computing device 800. In some embodiments, one or more blocks of process 300 are performed by one or more servers in a content management system, such as content management system 108.

At block 302, a computing device, such as a content item server 118, stores content in a content management system, such as content management system 108, for a plurality of users. The content includes a plurality of content items and a plurality of folders that are arranged in a plurality of hierarchies.

At block 304, a computing device, such as a control server 120, establishes a plurality of root namespaces. Each root namespace is associated a root folder of an account corresponding to one or more users. For example, a root namespace may be rooted to a root folder of an individual account of a user. Alternatively and/or in addition, a root namespace may be rooted to a root folder of an entity account that is associated with a set of users with permissions to access the root namespace of the entity account.

At block 306, a computing device, such as the control server 120, establishes a first namespace rooted to a first folder selected from the plurality of folders. In some embodiments, the first namespace is a root namespace of an individual account and/or an entity account. In some embodiments, the first namespace is a namespace rooted to a team folder which is associated with a set of individual accounts. In some embodiments, the first namespace is a shared namespace other than a root namespace of an individual account or an entity account.

At block 308, a computing device, such as the control server 120, maintains first permissions for the first namespace. The first permissions grant access to the first namespace to a first set of users of the plurality of users.

At block 310, a computing device, such as the control server 120, receives a request to share a second folder that is a child of the first folder in a particular hierarchy of the plurality of hierarchies.

At block 312, a computing device, such as the control server 120, establishes a second namespace rooted to the second folder. In some embodiments, the second namespace is a nested namespace.

At block 314, a computing device, such as the control server 120, maintains second permissions for the second namespace. The second permissions grant access to the second namespace to a second set of users of the plurality of users.

At block 316, process 300 returns and/or terminates. For example, processing may continue to processing a successive request, passing control to a calling process, generating any appropriate record or notification, returning after a method or function invocation, or terminating.

Namespace Metadata

The namespace metadata database 128 stores information about namespaces, which may be synchronized with namespace metadata 116 on the client devices 102-104. For example, the namespace database 128 may store information about root namespaces of individual accounts that are unshared, root namespaces of entity accounts that are shared, other shared namespaces, and/or other unshared namespaces.

According to some embodiments, the namespace metadata database 128 includes hierarchical data that describes a hierarchy of content items and/or folders that belong to each corresponding namespace. In some embodiments, a set of records are kept for each namespace, where each record indicates a content item or folder and a path of the content item or folder relative to the namespace. Such records may also include one or more namespaces that are mounted in the current namespace, along with a path relative to the current namespace indicating a mounting location within the current namespace.

According to some embodiments, the namespace metadata database 128 includes permissions comprising access control information for namespaces. In some embodiments, permissions are only maintained for shared namespaces, or namespaces that are rooted to a shared folder. In some embodiments, the permissions grant access to content in the namespace to a set of users. Such permissions may be subject to the permissions maintained for a nested namespace within a parent namespace. That is, a user that is a member of a parent namespace is not necessarily be a member of a child namespace. In some embodiments, even if a user is a member of both a parent namespace and a child namespace, the user may not have the same access type with respect to the parent namespace and the child namespace.

Permissions

Permissions are maintained that specify or otherwise indicate which user(s) and/or group(s) of users have access to content that belongs to a namespace. When the permissions for a particular namespace grant access to the particular namespace to a particular user, the content in the particular namespace is available to the user. The permissions may specify different levels of access, or access types, which shall be described in greater detail hereafter.

Although one or more embodiments described hereafter refer to permissions that grant access to a user without specifying a device, the permissions in any embodiment may be also implemented such that permissions are specifically granted to all devices of a user, a specific device of a user, or any combination thereof.

The permissions corresponding to a particular namespace can be based on explicit and/or implicit permissions specifying and/or indicating which user(s) and/or group(s) of users have access to the content, such as content items and folders, that belong to the namespace. The permissions corresponding to a particular namespace may also specify the access type granted to a user. Some example access types are described below; a subset of access types, a superset of access types, an overlapping set of access types, or other access types may be implemented:

Exist—This access type allows a user to know about the existence of the content item or folder through its namespace Path. However, the user does not have permission to open or access the contents of the content item or folder.

View—This access type allows a user to open and access the contents of the content item or folder but cannot modify the contents. This access type may include all access rights granted by the Exist access type.

Modify—This access type allows a user to modify the contents of the content item or folder. However, the user does not have permission to delete the content item or folder. This access type may include all access rights granted by the View access type.

Remove—This access type allows a user to delete or remove a content item or folder from the namespace. This access type may include all access rights granted by the Modify access type.

Manage—This access type allows a user to manage permissions of other users, such as adding and/or removing members, and/or sharing a child folder. This access type may include all access rights granted by the Remove access type.

In some embodiments, the permissions corresponding to a particular namespace are maintained as one or more access control records. An access control record can correspond to individual content items, individual folders, or a collection of content, such as a namespace that corresponds to a particular shared folder. The access control records may be grouped, indexed, or otherwise sorted by namespace, another property. In some embodiments, access control records are maintained for namespaces, content items and/or folders that are not shared. Alternatively, access control records may be maintained for shared namespaces, content items and/or folders that belong to a shared workspace.

In some embodiments, a user does not have access to a particular namespace, content item or folder unless the there is an access control record in the namespace metadata database 128 that grants explicit access or implicit access to the user.

In some embodiments, the permissions for a namespace grant explicit access to a particular user. Explicit access may come in the form of, for example, one or more access control lists (ACLs) and/or other data associated with the namespace, or an identifier thereof. For example, when a particular shared folder is shared with one or more users, the one or more users are explicitly added to the permissions maintained for the shared namespace rooted to the particular shared folder. The one or more users are explicit members of the shared namespace.

In some embodiments, the permissions for a namespace grant implicit access to a particular user Implicit permissions are derived from explicit permissions for another namespace. For example, if the permissions for a particular namespace specify that permissions are inherited from a parent namespace in which the particular namespace is mounted, then users with access to the parent namespace will have access to the particular namespace based on the permissions maintained for the parent namespace. These members are implicit members of the particular namespace.

In some embodiments, implicit permissions for a particular namespace may be derived from an ancestor namespace that is higher than a parent namespace when the permissions for the particular namespace and the relevant ancestor namespace/s specify that permission are inherited. For example, when a client device requests access to particular content that belongs to a particular namespace, a traversal of the hierarchy of namespaces may be performed to evaluate the corresponding permissions and to determine whether the user is an implicit member of the particular namespace.

In some embodiments, an access control record for a particular namespace, content item, or folder includes all of the following information, or a subset or a superset thereof:

Parent Namespace ID—An identifier of a parent namespace to which the particular namespace, content item or folder belongs; for a namespace, the parent namespace ID may be NULL, such as when the particular namespace is a root namespace.

Inherit Flag—An indicator that specifies whether permissions should be inherited from the parent namespace specified by Parent Namespace ID;

Access Control List—A set of one or more access control items that each specify a user or a group of users and one or more permissions that apply to the user or group of users with respect to the particular namespace, content item or folder.

In some embodiments, a shared nested namespace is created when unique permissions are requested for a shared folder within a parent shared namespace to which the shared folder belongs. Example situations include, but are not limited to the sharing of a subfolder with a user who is not a member of the parent shared namespace, the granting of different permission types to the subfolder to a user who is a member of the parent shared namespace, or further restricting access to the subfolder.

In some embodiments, creating the shared nested namespace comprises setting the Parent Namespace ID to identify the parent shared namespace, and setting the Inherit Flag based to indicate whether permissions should be inherited from the parent namespace. Permissions are maintained for the shared nested namespace as well as the parent namespace. Depending on the value of the Inherit Flag, permissions for the shared nested namespace may or may not be inherited from the parent shared namespace.

Traversal Rights

In an example configuration, a first namespace is a shared namespace that is rooted to a first folder, and a second namespace is a nested shared namespace that is rooted to a second folder contained in the first folder in a particular hierarchy of content items and folders. Thus, the first namespace is a parent namespace of the second namespace.

When a user has access to the first namespace and the second namespace, the user is provided access to the first folder and its children in the particular hierarchy, including the second folder. When a user has access to the first namespace and does not have access to the second namespace, the user is provided access the first folder and its children in the particular hierarchy, excluding the second folder. That is, the exclusion of the user from the second namespace acts to negate permissions for contents of the first folder that belong to the second namespace; but for the negative permissions (i.e. the user not having access to the second namespace), the user would otherwise have been granted access to the contents of the first folder. When a user does not have access to the first namespace and has access to the second namespace, the user is provided access to the second folder and not the first folder.

In some embodiments, content management system 108 may provide the client devices 102-104 hierarchical data describing one or more hierarchies of content, such as content items and folders. For example, the hierarchical data may allow the client devices 102-104 to display the a file-system like hierarchy to a user, synchronize a local copy of the available content using a file-system like hierarchy, and/or otherwise access the content based on the file-system like hierarchy. In some embodiments, permissions to access one or more namespaces may include an access type (e.g. exist) that restricts access to knowing about the existence of content items and/or folders in the namespace. The exist access type allows a user to view the hierarchical data.

Figure 4C:
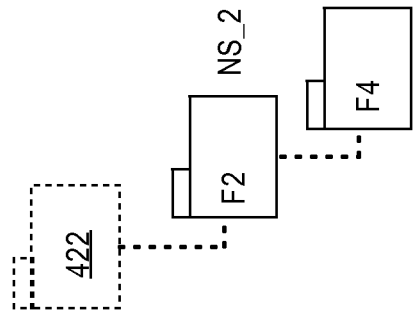
FIGS. 4A-C illustrate example hierarchical data available to a particular user based on permissions in an accordance with one or more embodiments.
Figure 4B:
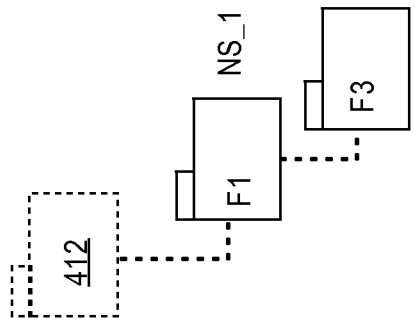
Figure 4A:
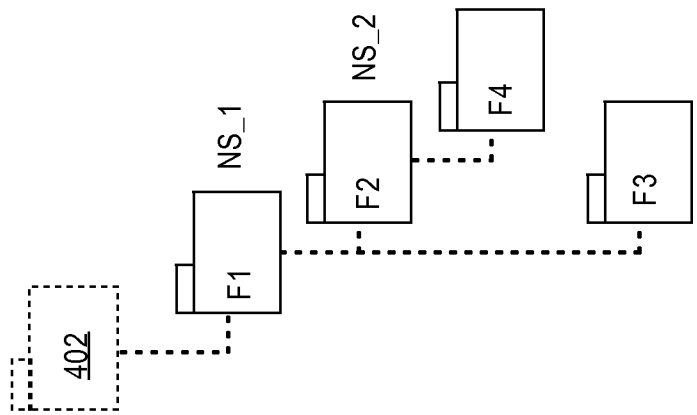

FIGS. 4A-C illustrate example hierarchical data available to a particular user based on permissions in an accordance with one or more embodiments. When a first user has at least exist access to a first namespace NS_1 and a second namespace NS_2, the client device of the first user can display, store and/or otherwise use the hierarchical data 400 describing the particular hierarchy from the first folder F1, including the second folder F2 and its descendants. NS_1 is shown as being mounted in another namespace rooted to and/or containing folder 402, which may be the root folder of the first user, or another folder that the first user has access to.

When a second user has at least exist access to a first namespace NS_1 but not the second namespace NS_2, the client device of the second user can display, store and/or otherwise use the hierarchical data 402 describing the particular hierarchy from the first folder F1, excluding the second folder F2 and its descendants. NS_1 is shown as being mounted in another namespace rooted to and/or containing folder 412, which may be the root folder of the second user, or another folder that the second user has access to.

In one embodiment, when a third user has at least exist access to the second namespace NS_2 but does not have at least view access to the first namespace NS_1, the client device of the third user can neverless display, store and/or otherwise use the portion of the hierarchical data 402 describing just the second folder F2 and its descendants. That is, the user is provided the information that folder F2 is a child of folder F1, even if the user cannot access the other contents of the first folder F1. NS_2 is shown as being mounted in another namespace rooted to and/or containing folder 422, which may the root folder of the third user, or another folder that the third user has access to.

Mounting a Namespace

A nested namespace may be mounted to the parent namespace at a path relative to the parent namespace. As used herein, a mounting operation refers to an operation that mounts or unmounts one or more namespaces from one or more mounting locations. In some embodiments, a shared namespace, may be mounted by multiple users. In some embodiments, a user can mount a shared namespace to either his root namespace, or another namespace that descends from his root namespace. That is, the shared namespace will be mounted in a mounting location comprising a path relative to the root namespace. When there is one or more intermediate namespaces, a path relative to the root namespace may be constructed by traversing a hierarchy of namespaces.

A nested namespace may be mounted in another nested namespace, creating a namespace hierarchy. In some embodiments, a limit to the levels of nesting may be implemented. For example, a limit may be implemented as a constraint that must be satisfied before a mounting operation is performed. Constraints shall be described in greater detail hereafter.

In some embodiments, only users who are explicit members are allowed to directly mount a shared namespace. That is, the content management system 108 may disallow a user from mounting a namespace when the user is only an implicit member of the namespace, such as a user who has access to a namespace because the namespace inherits permissions from a parent namespace of which the user is a member. Such a user will still be able to access the namespace through the parent namespace.

Actions Involving a Mounting Operation

The following example actions involve a mounting operation (e.g. mounting or unmounts one or more namespaces from one or more mounting locations). Other actions that involve mounting operation/s may be implemented based on nested namespaces and the permissions maintained for the nested namespaces. In some embodiments, the following actions and/or mounting operations are implemented, or a subset or a superset thereof. Any of these actions and/or mounting operations may be implemented as a default operation, or the relevant users may be prompted to allow the actions and/or mounting operations to proceed. Other behaviors other than the mounting operations described may be implemented in response to any of these actions.

In some embodiments, one action that causes one or more mounting operations is when a user creates a shared folder with distinct permissions, where the shared folder is in a parent shared folder. A nested namespace is created that is rooted to the new shared folder. Members of a parent namespace rooted to the parent shared folder may or may not see the change based on whether they are members of the nested namespace. For example, if the nested namespace does not inherit permissions and a particular member of the parent namespace is not a member of the nested namespace, then the contents of the nested namespace will be removed from the member's client device/s. In some embodiments, if a particular user is a member of both the nested namespace and the parent namespace, the namespace metadata for the new nested namespace is synchronized. In some embodiments, a GUI on a client device of the particular user may indicate that the shared folder has distinct permissions. If a particular user is only a member of the nested namespace, the particular user will not receive hierarchical data outside of the nested namespace. Such a user is referred to herein as an external user because the user is unaware of the parent namespace.

In some embodiments, one action that causes one or more mounting operations is when a member of a child namespace is added as a member of a parent namespace in which the child namespace is mounted. When a user gains access to the parent namespace, if the child namespace is mounted in the root namespace of the user, the child namespace may be unmounted from the root namespace of the user, and the parent namespace may be mounted in the root namespace of the user. The user may be retained as an explicit member of the child namespace.

In some embodiments, one action that causes one or more mounting operations is when a user deletes a shared folder to which a namespace is rooted that is mounted in the user's root namespace. In response, a mounting operation may be performed that unmounts the namespace rooted to the shared folder that the user wishes to delete. The shared folder and the corresponding namespace may still be available to other users, and the mounting of the corresponding namespace with respect to other users (e.g. other users' namespaces) is unaffected.

In some embodiments, one action that causes one or more mounting operations is when a user deletes a child shared folder that they have mounted in a team folder to which a shared namespace is rooted. The user may be required to have Manage access to the child shared folder and Modify access to parent shared folder. The child shared folder may be unshared for all users, including external users. In some embodiments, the content management system retains the content associated with the child namespace and the child shared folder. This allows for data to restored with respect to the child shared folder and its contents.

In some embodiments, one action that causes one or more mounting operations is when a user moves a child shared folder outside of parent shared folder to a different namespace than the parent namespace rooted to or containing the parent shared folder. The user may be required to have Modify access to the parent namespace, Modify access to the destination namespace, and Manage access to the child namespace rooted to the child shared folder being moved. External members are retained for the child namespace, but any implicit members who inherited permissions based on their membership in the parent namespace may no longer have access to the child namespace. In one embodiment, when a child shared folder is moved outside of the parent shared folder, an explicit member of the child namespace with access to the parent namespace will unmount the child namespace from the parent namespace and remount the child namespace.

In some embodiments, one action that causes one or more mounting operations is when permissions granting a user access to a parent namespace are revoked, but the user still has access to a child namespace of the parent namespace. In this case, the parent namespace is unmounted from the root namespace of the user, and the child namespace is mounted to the root namespace of the user.

In some embodiments, one action that causes one or more mounting operations is when a user renames a shared folder to which a particular namespace is rooted. The user may be required to have Modify access to the particular namespace. In some embodiments, the change is implemented by unmounting the shared namespace from its current parent namespace and then remounting the modified shared namespace to the current parent namespace. This action will cause the synchronization of the change in all users who have permissions to access both the parent namespace and the particular namespace.

Mount Constraints

In some embodiments, one or more constraints are imposed on the mounting of namespaces. For example, content management system 108 may require that a set of one or more constraints is satisfied before completing an action that requires a mounting operation. Such constraints may be used to prevent recursive loops, prevent ambiguities in access permissions, prevent errors, control complexity, and/or for any other reason. For example, one or more constraints may enforce a traditional file system hierarchy within a namespace associated with an account, which does not include cyclic graphs.

In some embodiments, a first constraint requires that a namespace cannot be mounted to more than one path in any shared namespace that is not a root namespace. That is, a namespace cannot have more than one parent namespace that is not a root namespace. The first constraint is analogous to restricting the hierarchy of content contained in a shared namespace, other than a root namespace, to a simple directory tree. In some embodiments, a version of the first constraint is implemented that does not allow a namespace to be mounted in more than one path in any shared namespace, including a root namespace that is also a shared namespace.

In some embodiments, the first constraint is implemented by associating the namespace with a single parent pointer identifying a single parent namespace other than root namespaces. For example, the parent-child relationship between a parent root namespace and child shared namespace may be maintained in the namespace metadata for the parent root namespace. Thus, the single parent pointer does not need to refer to the root namespace for any account that has the child shared namespace mounted in the respective root namespace.

In some embodiments, a second constraint requires that a namespace cannot be mounted to more than one path in a root namespace, or a child namespace thereof, for any user. That is, each namespace can only be mounted once in a root namespace, including in any intermediate namespaces that the root namespace is an ancestor of. When implemented, the second constraint will prevent looping scenarios, which is consistent with a traditional file system hierarchy. For example, if a nested namespace B is nested within namespace A, then a user cannot mount both B and A directly to a root namespace of the user, since namespace A includes nested namespace B; this would result in namespace B being mounted twice in the root namespace of the user.

The content management system 108 may require a set of constraints to be satisfied that includes one or more of the first constraints, the second constraint, and one or more other constraints. In one embodiment, when the content management system 108 receives a request from a particular user to mount the second namespace to a particular path in a particular namespace, the content management system 108 determines whether a set of one or more constraints is satisfied. When the set of one or more constraints is satisfied, mounting the second namespace to the particular path in the particular namespace. When any constraint in the set of one or more constraints is not satisfied, the content management system 108 may indicate that the action requiring the mounting operation has failed. Alternatively and/or in addition, the content management system 108 may perform a default operation, prompt a user with one or more alternative solutions, perform one or more alternative solutions, resolve the request in a manner that satisfies the one or more constraints, and/or any combination thereof.

Mount Lock

In some embodiments, one or more constraints are enforced using mount locks. As used herein, the term mount lock refers to a synchronization mechanism associated with individual namespaces to control access to the corresponding namespace with respect to mounting location changes. For one or more constraints, satisfying the constraint comprises obtaining mount locks for affected namespaces. To successfully perform a mounting operation, the mount lock must be obtained for each affected namespace.

As used herein, the term "affected namespace" refers to any namespace whose corresponding mount lock must be held in order to perform a particular mounting operation. In some embodiments, the affected namespaces for a mounting operation include the target namespace on which the mounting operation is performed, any ancestor namespaces of the target namespace, and when the mounting operation specifies a new parent namespace for the target namespace, the new parent namespace and any ancestor namespaces of the new parent namespace.

In some embodiments, mount locks are obtained for the following mounting operations:
  mount a namespace NS_X or any of its descendants to another mounting location;
  mount another namespace into NS_X or any of its descendants;
  unmount NS_X or any of its descendants;
  unmount another namespace from NS_X or any of its descendants.

In some embodiments, root namespaces are excluded from the set of affected namespaces. For example, excluding the root namespaces from the set of affected namespaces can help enforce the constraint a second namespace cannot be mounted to more than one path in any shared namespace that is not a root namespace. One way of excluding a root namespace is to not require a mount lock for the root namespace. In some embodiments, only root namespaces of individual accounts are excluded from the set of affected namespaces, while root namespaces of entity accounts are included.

Figure 5:
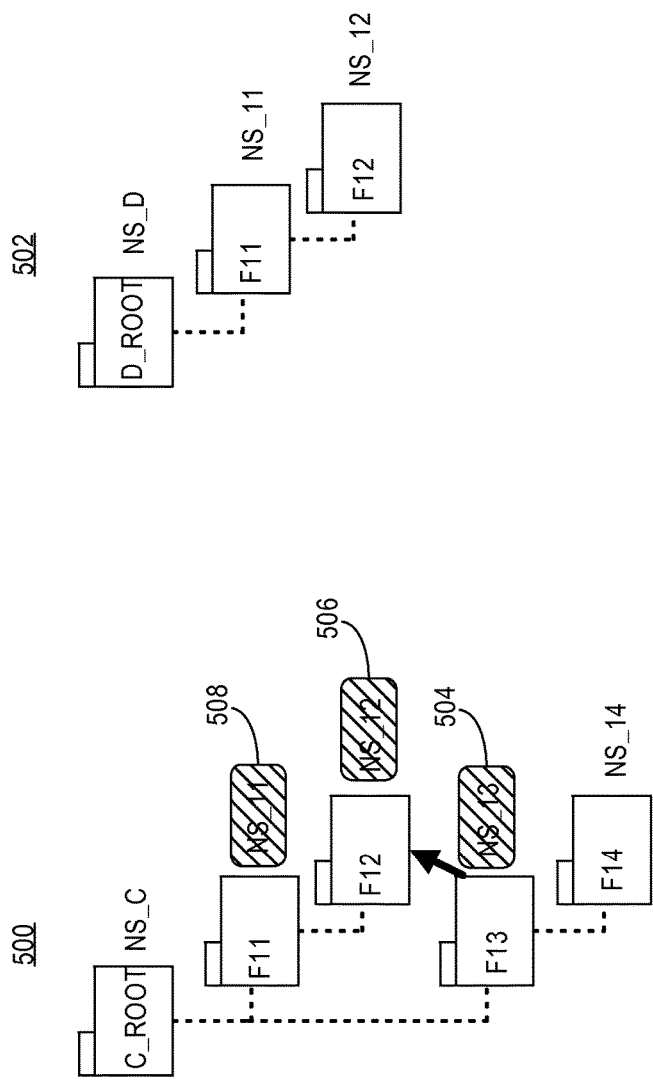
FIG. 5 illustrates example mount locks that are successfully obtained with respect to an example mounting operation in accordance with one or more embodiments.

FIG. 5 illustrates example mount locks that are successfully obtained with respect to an example mounting operation in accordance with one or more embodiments. FIG. 5 shows a hierarchy 500 of content available to user C and a hierarchy 502 of content available to user D that is managed by a content management system, such as content management system 108. For user C, a root namespace NS_C is rooted to the root folder C_ROOT of user C's hierarchy 500. For user D, a root namespace NS_D is rooted to the root folder D ROOT of user D's hierarchy 502.

The arrow indicates that user C attempts to move folder F13 to folder F12. To perform this action, namespace NS_13 must be unmounted from root namespace NS_C, and namespace NS_13 must be mounted to namespace NS_12. To successfully perform the mounting operation/s, the mount lock must be obtained for each affected namespace.

In some embodiments, the affected namespaces include the target namespace and its ancestors, excluding any root namespace. NS_13 is an affected namespace because it is the target namespace on which the mounting operation is performed. Thus, mount lock 504 is obtained for NS_13.

In some embodiments, the affected namespaces include the new parent namespace and its ancestors, excluding any root namespace. NS_12 is an affected namespace because it a new parent namespace for the target namespace. Thus, mount lock 506 is obtained for NS_12. NS_11 is an affected namespace because it an ancestor of NS_12. Thus, mount lock 508 is obtained for NS_12.

In this case, all the mount locks for the affected namespaces are successfully obtained. Thus, the content management system proceeds to perform the mounting operation and release the mount locks.

Figure 6:
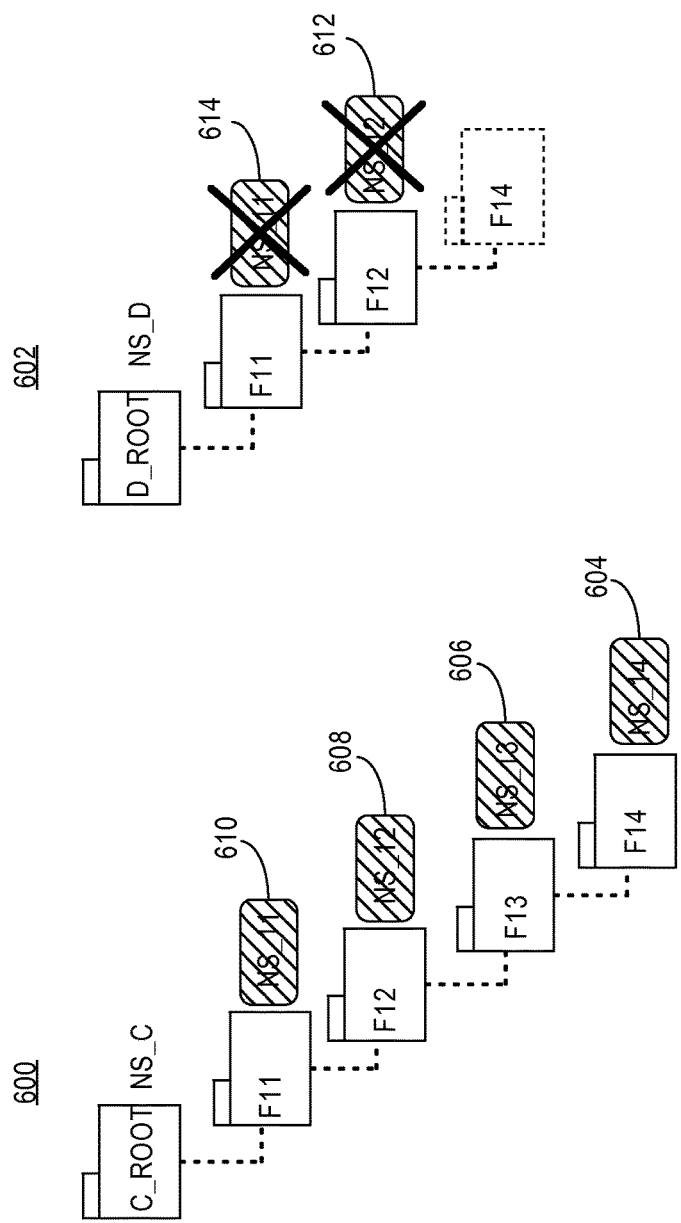
FIG. 6 illustrates example mount locks that are not successfully obtained with respect to an example mounting operation in accordance with one or more embodiments.

FIG. 6 illustrates example mount locks that are not successfully obtained with respect to an example mounting operation in accordance with one or more embodiments. FIG. 6 shows a hierarchy 600 of content available to user C after the successful mounting operation shown in FIG. 5. FIG. 6 also includes a hierarchy 602 of content available to user D. When user D makes attempts to mount folder F14 to folder F12, a mounting operation is required.

To successfully perform the mounting operation, the mount lock must be obtained for each affected namespace. NS_14 is an affected namespace because it is the target namespace on which the mounting operation is performed. Thus, mount lock 604 is obtained for NS_14.

In some embodiments, the affected namespaces include the ancestors of the target namespace, excluding any root namespace. Thus, mount locks 606-610 are obtained for namespaces NS_13, NS_12, and NS_11.

In some embodiments, the affected namespaces include the new parent namespace and its ancestors, excluding any root namespace. In this case, because user D is attempting to mount NS_14 to NS_12, the affected namespaces includes NS_12 and its ancestor namespace NS_11. However, because the mount lock 608 for NS_12 is already held, mount lock 612 cannot be obtained. Likewise, because the mount lock 610 for NS_11 is already held, mount lock 614 cannot be obtained.

If a mount lock for an affected namespace is not successfully obtained, then the constraint fails. In some embodiments, when the constraint fails, the action requiring the mounting operation and the failure is reported, such as to other components of content management system 108 and/or client devices 102-104. In some embodiments, a mounting operation can be salvaged, such as by automatically performing a default legal mounting operation, prompting the user with one or more possible legal mounting operations, and/or determining a compatible mounting operation that will resolve cause of failure and satisfy the constraint.

Example Process for Mounting a Namespace

Figure 7:
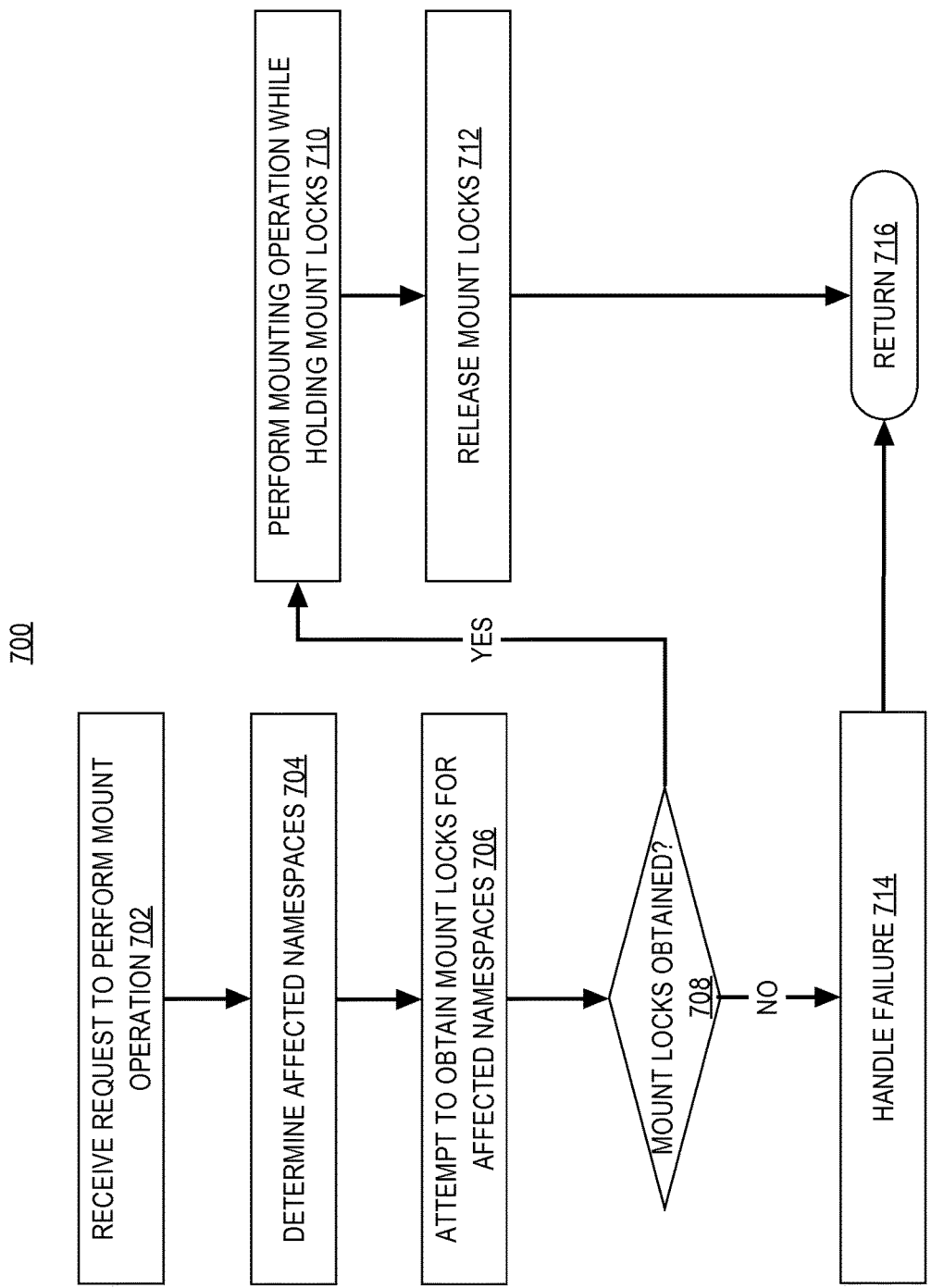
FIG. 7 is a flow diagram that depicts an example process for mounting a namespace in accordance with one or more embodiments.

FIG. 7 is a flow diagram that depicts an example process for mounting a namespace in accordance with one or more embodiments. Process 700 may be performed by one or more computing devices and/or processes thereof. For example, one or more blocks of process 700 may be performed by computing device 800. In some embodiments, one or more blocks of process 700 are performed by one or more servers in a content management system, such as content management system 108.

At block 702, a computing device, such as the control server 120, receives a request to perform a mounting operation on a target namespace. For example, the request may comprise an action that requires one or more namespaces to be mounted and/or unmounted from another namespace.

At block 704, the computing device determines a set of one or more affected namespaces for the mounting operation. In some embodiments, in addition to the target namespace, the set of one or more affected namespaces includes the target namespace on which the mounting operation is performed, any ancestor namespaces of the target namespace, and when the mounting operation specifies a new parent namespace for the target namespace, the new parent namespace and any ancestor namespaces of the new parent namespace.

At block 706, the computing device attempts to obtain the mount locks for the affected namespaces in the set of affected namespaces.

At decision block 708, it is determined whether the mount locks for the affected namespaces were successfully obtained. If it is determined that the mount locks for the affected namespaces were successfully obtained, processing proceeds to block 710.

At block 710, the computing device performs the mounting operation while holding the mount locks for the set of affected namespaces.

At block 712, the computing device releases the mount locks for the set of affected namespaces.

Returning to decision block 404, if it is determined that the mount locks for the affected namespaces were not successfully obtained, processing proceeds to block 714. At block 714, the requested mounting operation is not performed and the failure to perform the mounting operation is handled. In some embodiments, handling the failure comprises reporting the failure to one or more other components, such as another component of content management system 108 and/or one or more client devices 102-104. In some embodiments, handling the failure comprises salvaging the mounting operation, such as by automatically performing a default legal mounting operation, prompting the user with one or more possible legal mounting operations, and/or determining a compatible mounting operation that will resolve cause of failure and satisfy the constraint.

At block 716, process 700 returns and/or terminates. For example, processing may continue to processing a successive request, passing control to a calling process, generating any appropriate record or notification, returning after a method or function invocation, or terminating.

Example Computing Device

Figure 8:
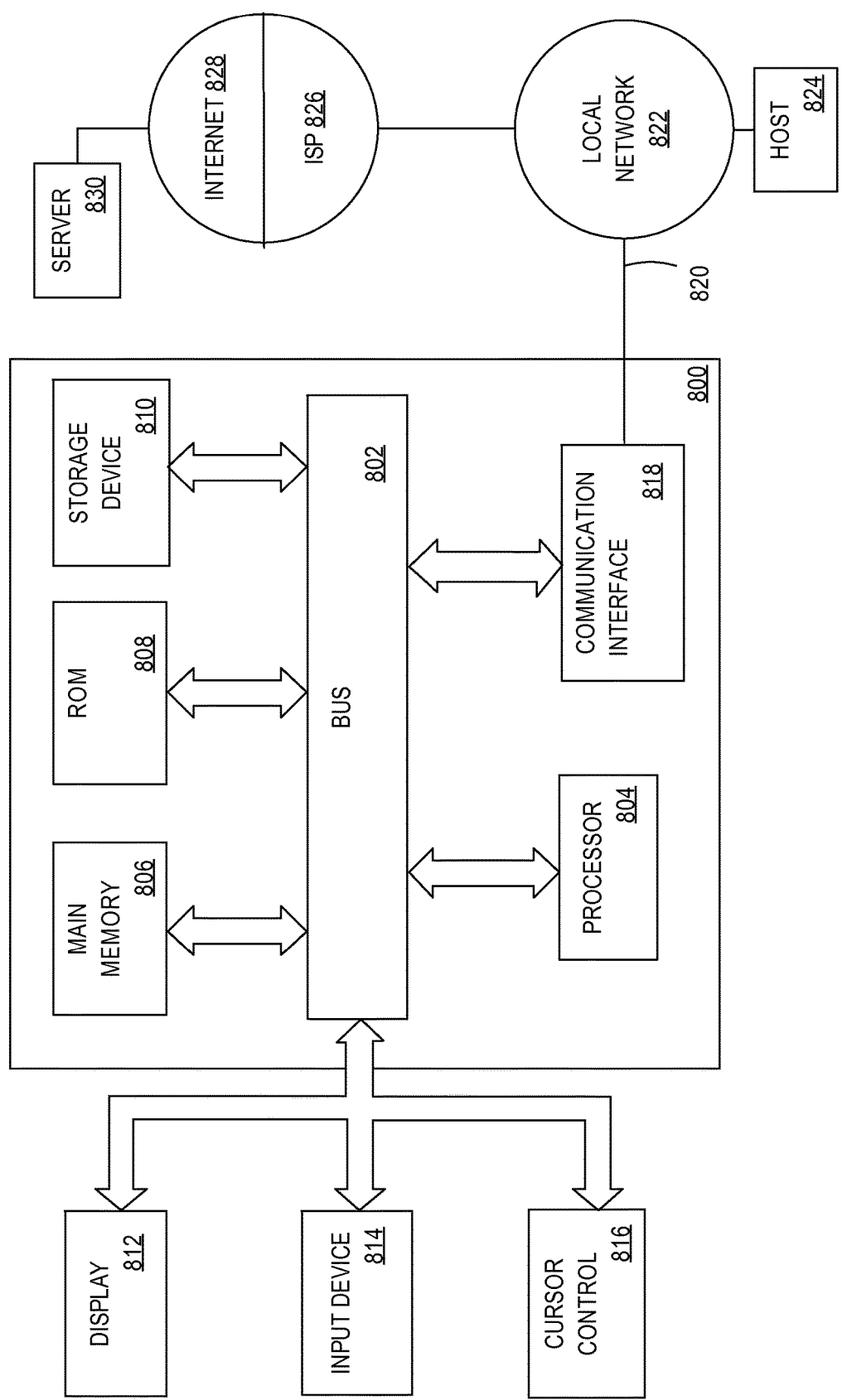
FIG. 8 is a block diagram of an example computing device on which one or more embodiments may be implemented.

FIG. 8 is a block diagram of an example computing device on which one or more embodiments may be implemented. Computing device 800 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 800 may include a bus 802 or other communication mechanism for addressing main memory 806 and for transferring data between and among the various components of device 800.

Computing device 800 may also include one or more hardware processors 804 coupled with bus 802 for processing information. A hardware processor 804 may be a general purpose microprocessor, a system on a chip (SoC), or other processor.

Main memory 806, such as a random access memory (RAM) or other dynamic storage device, also may be coupled to bus 802 for storing information and software instructions to be executed by processor(s) 804. Main memory 806 also may be used for storing temporary variables or other intermediate information during execution of software instructions to be executed by processor(s) 804.

Software instructions, when stored in computer-readable media accessible to processor(s) 804, render computing device 800 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 800 also may include read only memory (ROM) 808 or other static storage device coupled to bus 802 for storing static information and software instructions for processor(s) 804.

One or more mass storage devices 810 may be coupled to bus 802 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 810 (e.g., the main hard disk for the device) stores a body of program and data for directing operation of the computing device, including an operating system, user application programs, driver and other support files, as well as other data files of all sorts.

Computing device 800 may be coupled via bus 802 to display 812, such as a liquid crystal display (LCD) or other electronic visual display, for displaying information to a computer user. In some configurations, a touch sensitive surface incorporating touch detection technology (e.g., resistive, capacitive, etc.) may be overlaid on display 812 to form a touch sensitive display for communicating touch gesture (e.g., finger or stylus) input to processor(s) 804.

An input device 814, including alphanumeric and other keys, may be coupled to bus 802 for communicating information and command selections to processor 804. In addition to or instead of alphanumeric and other keys, input device 814 may include one or more physical buttons or switches such as, for example, a power (on/off) button, a "home" button, volume control buttons, or the like.

Another type of user input device may be a cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

While in some configurations, such as the configuration depicted in FIG. 8, one or more of display 812, input device 814, and cursor control 816 are external components (i.e., peripheral devices) of computing device 800, some or all of display 812, input device 814, and cursor control 816 are integrated as part of the form factor of computing device 800 in other configurations.

Functions of the disclosed systems, methods, and modules may be performed by computing device 800 in response to processor(s) 804 executing one or more programs of software instructions contained in main memory 806. Such software instructions may be read into main memory 806 from another storage medium, such as storage device(s) 810. Execution of the software instructions contained in main memory 806 cause processor(s) 804 to perform the functions of the example embodiment(s).

While functions and operations of the example embodiment(s) may be implemented entirely with software instructions, hard-wired or programmable circuitry of computing device 800 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more software instructions to processor(s) 804 for execution. For example, the software instructions may initially be carried on a magnetic disk or solid-state drive of a remote computer. The remote computer can load the software instructions into its dynamic memory and send the software instructions over a telephone line using a modem. A modem local to computing device 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor(s) 804 retrieves and executes the software instructions. The software instructions received by main memory 806 may optionally be stored on storage device(s) 810 either before or after execution by processor(s) 804.

Computing device 800 also may include one or more communication interface(s) 818 coupled to bus 802. A communication interface 818 provides a two-way data communication coupling to a wired or wireless network link 820 that is connected to a local network 822 (e.g., Ethernet network, Wireless Local Area Network, cellular phone network, Bluetooth wireless network, or the like). Communication interface 818 sends and receives electrical, electromagnetic, or optical signals that carry digital data streams representing various types of information. For example, communication interface 818 may be a wired network interface card, a wireless network interface card with an integrated radio antenna, or a modem (e.g., ISDN, DSL, or cable modem).

Network link(s) 820 typically provide data communication through one or more networks to other data devices. For example, a network link 820 may provide a connection through a local network 822 to a host computer 824 or to data equipment operated by an Internet Service Provider (ISP) 826. ISP 826 in turn provides data communication services through the world wide packet data communication network now commonly referred to as the "Internet" 828. Local network(s) 822 and Internet 828 use electrical, electromagnetic or optical signals that carry digital data streams. The signals through the various networks and the signals on network link(s) 820 and through communication interface(s) 818, which carry the digital data to and from computing device 800, are example forms of transmission media.

Computing device 800 can send messages and receive data, including program code, through the network(s), network link(s) 820 and communication interface(s) 818. In the Internet example, a server 830 might transmit a requested code for an application program through Internet 828, ISP 826, local network(s) 822 and communication interface(s) 818.

The received code may be executed by processor 804 as it is received, and/or stored in storage device 810, or other non-volatile storage for later execution.

Example Software System

Figure 9:
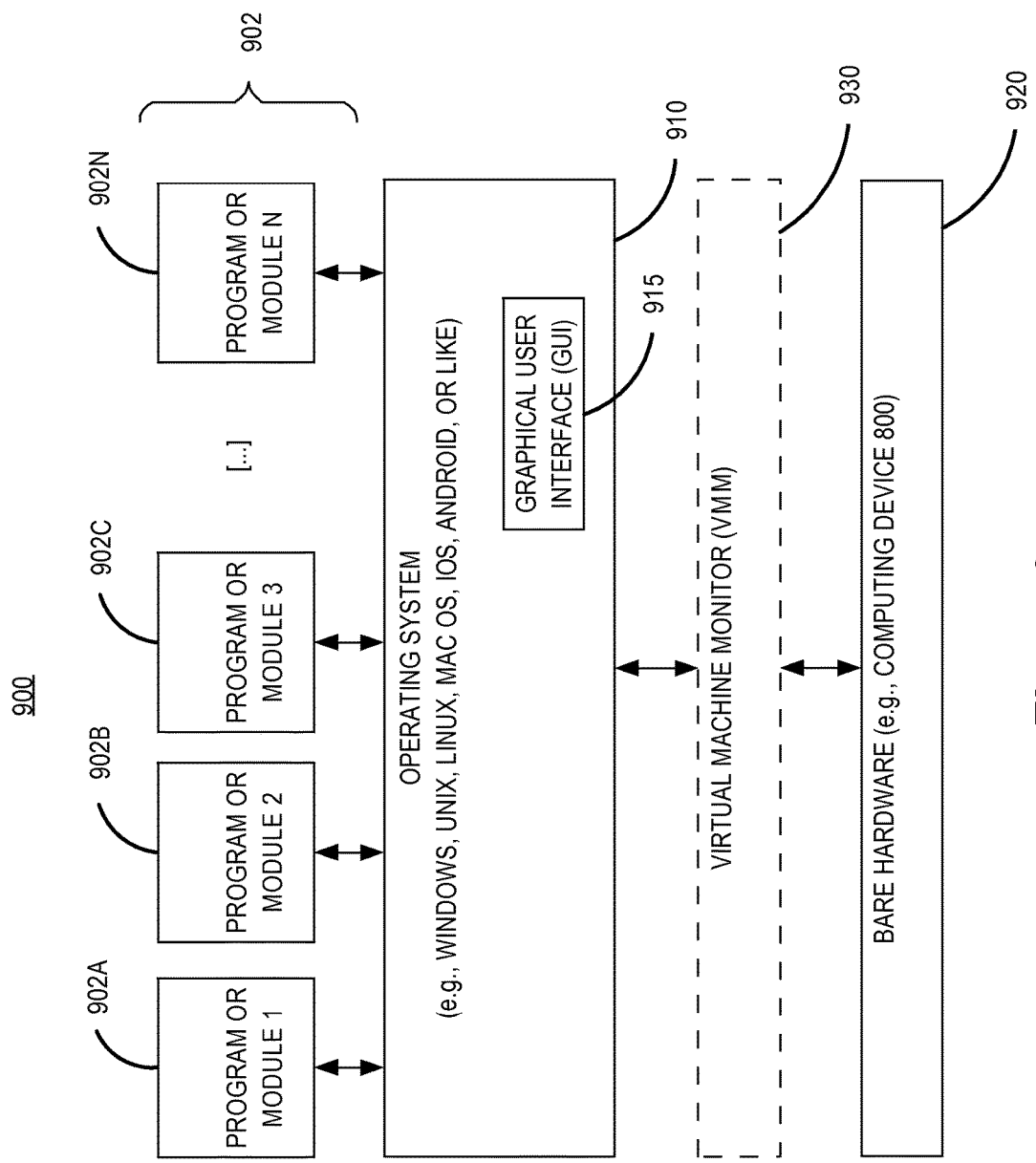
FIG. 9 is a block diagram of an example software system for controlling the operation of an example computing device on which one or more embodiments may be implemented.

FIG. 9 is a block diagram of a basic software system 900 that may be employed for controlling the operation of computing device 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing device 800. Software system 900, which may be stored in system memory (RAM) 806 and on fixed storage (e.g., hard disk or flash memory) 810, includes a kernel or operating system (OS) 910. The OS 910 manages low-level aspects of computer operation, including managing execution of processes, memory allocation, file input and output (I/O), and device I/O. One or more application programs, represented as 902A, 902B, 902C . . . 902N in FIG. 9, may be "loaded" (e.g., transferred from fixed storage 810 into memory 806) for execution by the system 900. The applications or other software intended for use on device 900 may also be stored as a set of downloadable computer-executable instructions, for example, for downloading and installation from an Internet location (e.g., a Web server).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of device 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the device 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of device 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A system, comprising:
   one or more hardware processors;
   one or more non-transitory storage media storing instructions that when executed by the one or more processors, cause the one or more processors to perform:
      storing, in a content management system, content for a plurality of users, the content comprising a plurality of content items and a plurality of folders arranged in a plurality of hierarchies;
      establishing, a plurality of root namespaces, wherein each root namespace, of the plurality of root namespaces, is rooted to a root folder of an account;
      establishing a first namespace rooted to a first folder selected from the plurality of folders;
      maintaining first permissions for the first namespace, the first permissions granting access to the first namespace to a first set of users of the plurality of users;
      receiving a user request to share a second folder with a second set of users of the plurality of users;
      wherein the user request is received at the content management system;
      wherein the second folder is a child of the first folder in a particular hierarchy of the plurality of hierarchies;
      based on the receiving the user request to share the second folder with the second set of users:
         establishing a second namespace rooted to the second folder; and
         maintaining second permissions for the second namespace, the second permissions granting access to the second namespace to the second set of users of the plurality of users;
      determining, by the content management system, that the second permissions allow a particular user to access the second namespace; and
      based on the determining, by the content management system, that the second permissions allow the particular user to access the second namespace, allowing the particular user to access the second folder.

2. The system of claim 1, wherein the instructions further comprise:
   providing access to the particular user, further based on:
      when the particular user has access to the first namespace and the second namespace, providing access to the particular user to the first folder and its children in the particular hierarchy, including the second folder;
      when the particular user has access to the first namespace and does not have access to the second namespace, providing access to the particular user to the first folder and its children in the particular hierarchy, excluding the second folder;
      when the particular user does not have access to the first namespace and has access to the second namespace, providing access to the particular user to the second folder.

3. The system of claim 1, wherein the first namespace is a shared namespace and the first folder is a shared folder in the first namespace.

4. The system of claim 1,
   wherein the first folder is in a subtree comprising a root folder of an entity account,
   wherein the first set of users comprises at least a subset of users associated with the entity account.

5. The system of claim 1, wherein the instructions further comprise:
   determining, based on at least one of the first permissions and the second permissions, that a particular user has access to at least one of the first namespace and the second namespace;
   when the particular user has access to the first namespace and the second namespace, providing hierarchical data to the particular user, the hierarchical data describing the particular hierarchy, including the second folder and its descendants;
   when the particular user has access to the first namespace and does not have access to the second namespace, providing hierarchical data to the particular user, the hierarchical data describing the particular hierarchy, excluding the second folder and its descendants;
   when the particular user does not have access to the first namespace and has access to the second namespace, providing hierarchical data to the particular user describing a subtree of the second folder.

6. The system of claim 1, wherein the instructions further comprise:
   setting a parent folder of the second namespace as a path in the first namespace;
   setting a permission inheritance flag for the second namespace indicating whether permissions should be inherited from a parent namespace;
   wherein when the permission inheritance flag indicates that permissions should be inherited from the parent namespace, maintaining the second permissions for the second namespace comprises including the first set of users in the second set of users.

7. The system of claim 1, wherein the instructions further comprise:
   receiving a request from a particular user to mount the second namespace to a particular path in a particular namespace, wherein the particular user has access to the particular namespace;
   wherein the second permissions grant access to the second namespace to the particular user;
   determining whether a set of one or more constraints is satisfied;
   when a set of one or more constraints is satisfied, mounting the second namespace to the particular path in the particular namespace.

8. The system of claim 7, wherein the set of one or more constraints includes a constraint that the second namespace cannot be mounted to more than one path in any shared namespace that is not a root namespace.

9. The system of claim 7, wherein the set of one or more constraints includes a constraint that the second namespace cannot be mounted to more than one path in a root namespace, or a child namespace thereof, for any user in the second set of users.

10. The system of claim 1, wherein the instructions further comprise:
receiving a request from a particular user to perform a mounting operation involving the second namespace;
enforcing at least one constraint by obtaining one or more mount locks for one or more affected namespaces, wherein the mounting operation fails if the one or more mount locks cannot be obtained.

11. A computer-implemented method comprising:
at one or more computing devices one or more processors and memory for storing instructions, which when executed by the one or more processors, perform the operations of:
storing, in a content management system, content for a plurality of users, the content comprising a plurality of content items and a plurality of folders arranged in a plurality of hierarchies;
establishing, a plurality of root namespaces, wherein each root namespace, of the plurality of root namespaces, is rooted to a root folder of an account;
establishing a first namespace rooted to a first folder selected from the plurality of folders;
maintaining first permissions for the first namespace, the first permissions granting access to the first namespace to a first set of users of the plurality of users;
receiving a user request to share a second folder with a second set of users of the plurality of users;
wherein the user request is received at the content management system;
wherein the second folder is a child of the first folder in a particular hierarchy of the plurality of hierarchies;
based on the receiving the user request to share the second folder with the second set of users:
establishing a second namespace rooted to the second folder; and
maintaining second permissions for the second namespace, the second permissions granting access to the second namespace to the second set of users of the plurality of users;
determining, by the content management system, that the second permissions allow a particular user to access the second namespace; and
based on the determining, by the content management system, that the second permissions allow the particular user to access the second namespace, allowing the particular user to access the second folder.

12. The method of claim 11, further comprising:
providing access to the particular user, further based on:
when the particular user has access to the first namespace and the second namespace, providing access to the particular user to the first folder and its children in the particular hierarchy, including the second folder;
when the particular user has access to the first namespace and does not have access to the second namespace, providing access to the particular user to the first folder and its children in the particular hierarchy, excluding the second folder;
when the particular user does not have access to the first namespace and has access to the second namespace, providing access to the particular user to the second folder.

13. The method of claim 11, wherein the first namespace is a shared namespace and the first folder is a shared folder in the first namespace.

14. The method of claim 11,
wherein the first folder is in a subtree comprising a root folder of an entity account,
wherein the first set of users comprises at least a subset of users associated with the entity account.

15. The method of claim 11, further comprising:
determining, based on at least one of the first permissions and the second permissions, that a particular user has access to at least one of the first namespace and the second namespace;
when the particular user has access to the first namespace and the second namespace, providing hierarchical data to the particular user, the hierarchical data describing the particular hierarchy, including the second folder and its descendants;
when the particular user has access to the first namespace and does not have access to the second namespace, providing hierarchical data to the particular user, the hierarchical data describing the particular hierarchy, excluding the second folder and its descendants;
when the particular user does not have access to the first namespace and has access to the second namespace, providing hierarchical data to the particular user describing a subtree of the second folder.

16. The method of claim 11, further comprising:
setting a parent folder of the second namespace as a path in the first namespace;
setting a permission inheritance flag for the second namespace indicating whether permissions should be inherited from a parent namespace;
wherein when the permission inheritance flag indicates that permissions should be inherited from the parent namespace, maintaining the second permissions for the second namespace comprises including the first set of users in the second set of users.

17. The method of claim 11, further comprising:
receiving a request from a particular user to mount the second namespace to a particular path in a particular namespace, wherein the particular user has access to the particular namespace;
wherein the second permissions grant access to the second namespace to the particular user;
determining whether a set of one or more constraints is satisfied;
when a set of one or more constraints is satisfied, mounting the second namespace to the particular path in the particular namespace.

18. The method of claim 17, wherein the set of one or more constraints includes a constraint that the second namespace cannot be mounted to more than one path in any shared namespace that is not a root namespace.

19. The method of claim 17, wherein the set of one or more constraints includes a constraint that the second namespace cannot be mounted to more than one path in a root namespace, or a child namespace thereof, for any user in the second set of users.

20. The method of claim 11, further comprising:
receiving a request from a particular user to perform a mounting operation involving the second namespace;
enforcing at least one constraint by obtaining one or more mount locks for one or more affected namespaces, wherein the mounting operation fails if the one or more mount locks cannot be obtained.

* * * * *